May 11, 1943. K. D. ASHLEY 2,318,577
NITROGUANIDINE
Filed June 27, 1941 3 Sheets-Sheet 2

INVENTOR.
KENNETH D. ASHLEY,
BY Frank J. Novotny, jr.
ATTORNEY.

May 11, 1943.   K. D. ASHLEY   2,318,577
NITROGUANIDINE
Filed June 27, 1941   3 Sheets-Sheet 3

INVENTOR.
KENNETH D. ASHLEY,
BY Frank J. Novotny, jr.
ATTORNEY.

Patented May 11, 1943

2,318,577

UNITED STATES PATENT OFFICE 2,318,577

NITROGUANIDINE

Kenneth D. Ashley, Darien, Conn., assignor to American Cyanamid Company, New York, N. Y., a corporation of Maine Application June 27, 1941, Serial No. 400,128

1 Claim. (Cl. 260—564)

This invention relates to apparatus for and a method of preparing crystalline substances in an extremely fine state of subdivision.

Heretofore it has been difficult and frequently impossible to prepare such crystalline substances as, for example, nitroguanidine in the form of discrete crystals less than 15 microns in width or less than about 300 to 400 microns in length. The usual methods of crystallization or recrystallization, even when supplemented by subsequent grinding or ball-milling, invariably resulted in the obtainment of much larger crystalline products except when effected under commercially unfeasible conditions. Furthermore, the grinding of explosive crystalline materials in order to prepare a finely divided product, is a distinct hazard to the workmen engaged therein and may result in the destruction of the plant carrying out such a process.

It is an object of this invention to prepare crystalline materials of an extremely small and uniform size. It is a further object to prepare such substances by means of a continuously operable process. A still further object is to provide an economical process for effecting this crystallization. Another object is to prevent crystal growth to excessive size and prevent crystal aggregation during the process of crystallization. Still another object is to effect partial evaporation or chilling of the solute using the mother liquor to carry away any remaining undesirable impurities in solution. This avoids the accretion of these impurities on the crystalline product and results in a high degree of purity in the final product. Still other and further objects will become apparent from the following description.

In general, this invention comprises a process for preparing crystalline substances in a finely divided state by an improved spray treatment of their solutions. Such solutions may be aqueous or those prepared from organic, inorganic or mixed solvents. Preferably, the substances included herein are substantially insoluble or relatively insoluble in the particular solvent used at relatively low temperatures and relatively soluble at somewhat higher temperatures which latter are still below a temperature at which the solute undergoes rapid decomposition.

More particularly, the invention in one embodiment thereof contemplates forming an aqueous solution of the substance at such a concentration that a supersaturated solution results when it is cooled and/or concentrated and especially when it is cooled rapidly by spraying the hot solution, such as for example, into a chamber wherein a constantly changing and circulating gas, namely air or the like, is maintained at atmospheric pressure. As a result, crystals form and are suspended in the small droplets of the solution so that crystals and solution deposit on the walls and floor of the chamber for subsequent collection.

In a further specific application of the principles of this invention, the cooling and/or evaporation step includes a spray as above, together with a countercurrent air flow which, because of the extremely rapid cooling and/or evaporation effects obtained when used in this combination, results in the final collection of minute crystals of a highly uniform size and degree of purity.

Thus it has been found in accordance with one embodiment of this invention that by discharging as by spraying or otherwise finely subdividing a 4.0 to 8.0% aqueous solution of nitroguanidine at 85 to 110° C., for example, into a spray-chamber filled with circulating air at room temperature and atmospheric pressure or against a wall with a circulating air environment, there is formed pure crystalline nitroguanidine in a degree of subdivision far greater than that heretofore obtained with ordinary methods of crystallization, by preventing further and excessive cooling and evaporation by washing the crystals suspended in the liquid solute with mother liquor from a previous crystallization and collecting the crystals. Such crystals have a size of the order of less than 5 microns in width and less than 150 microns in lengths.

Although any concentrations of nitroguanidine can be used in the process of this invention, solutions of approximately 8.0% or less are desirable because the process can then be worked at or near the temperature of boiling water and under atmospheric pressure, thus avoiding the expense of high temperature and high pressure apparatus. Solutions of greater concentration, up to 15 or 20% or even higher, can be used by taking advantage of the higher temperatures and pressures necessary to prepare the same. In this process, the crystals are caught and their growth suspended substantially at the instant of their formation, it being necessary, merely, regardless of the concentration of the solution used, either to lower the temperature or increase the concentration to a point at which the crystals begin to form in the solvent and then to stop crystal growth immediately.

In order to facilitate the further description of this invention, drawings relating to specific embodiments are included herein. In the drawings.

In the drawings, corresponding elements are similarly numbered in each of the figures in order to facilitate an understanding of the related structures.

Figure 1:
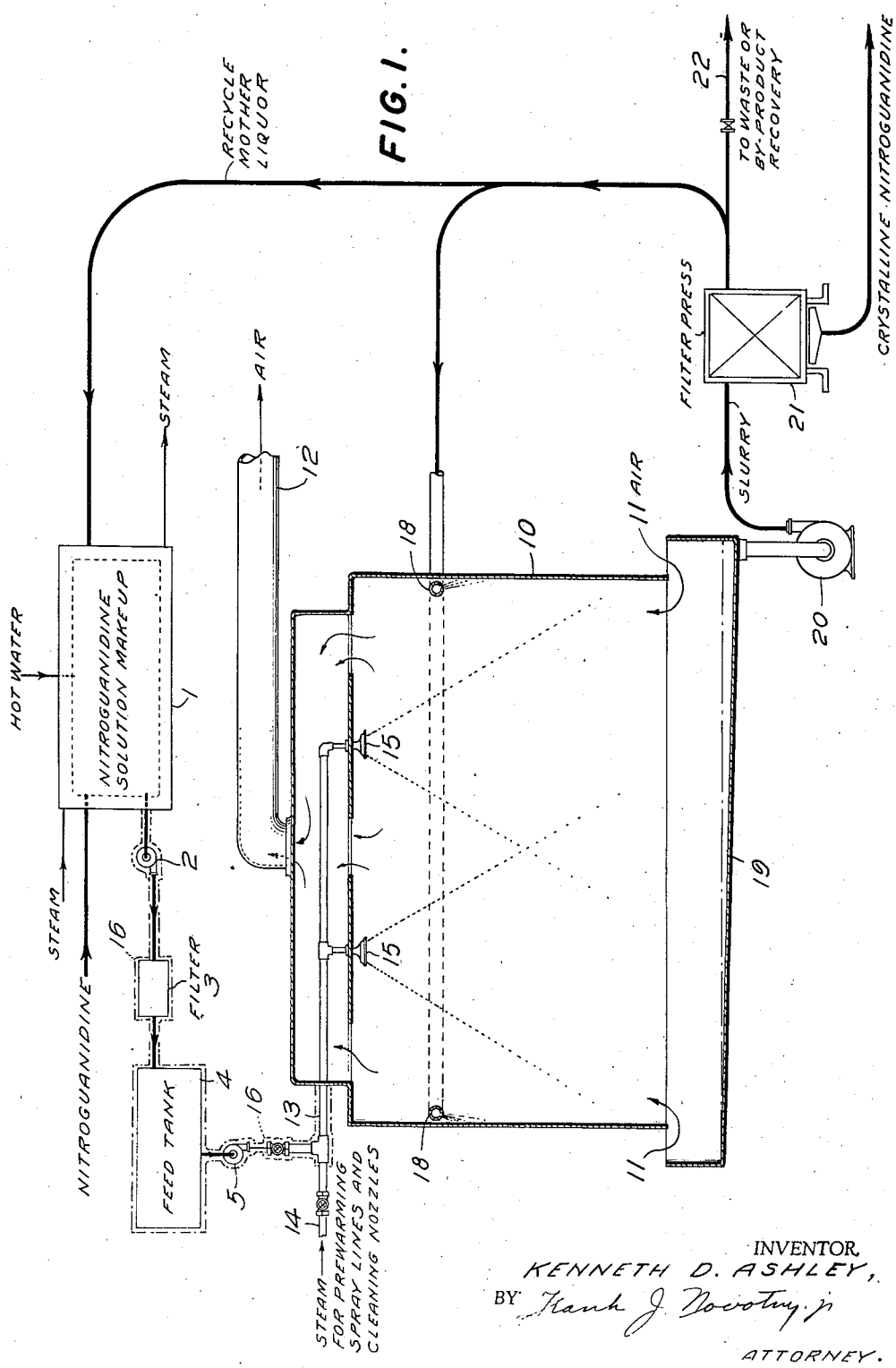
Figure 1 is a flow sheet including a detailed sectional view of a spray chamber showing the operation of the invention applied to the crystallization of nitroguanidine.
Figure 2:
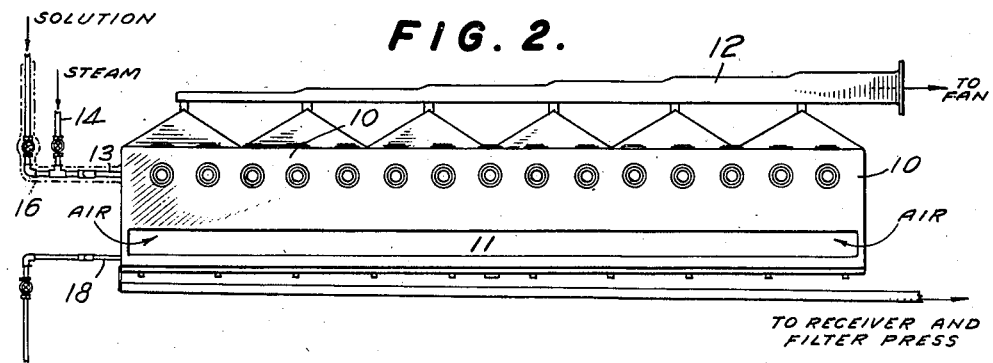
Figure 2 is an external view of another spray cooling chamber for carrying out the invention.
Figure 3:
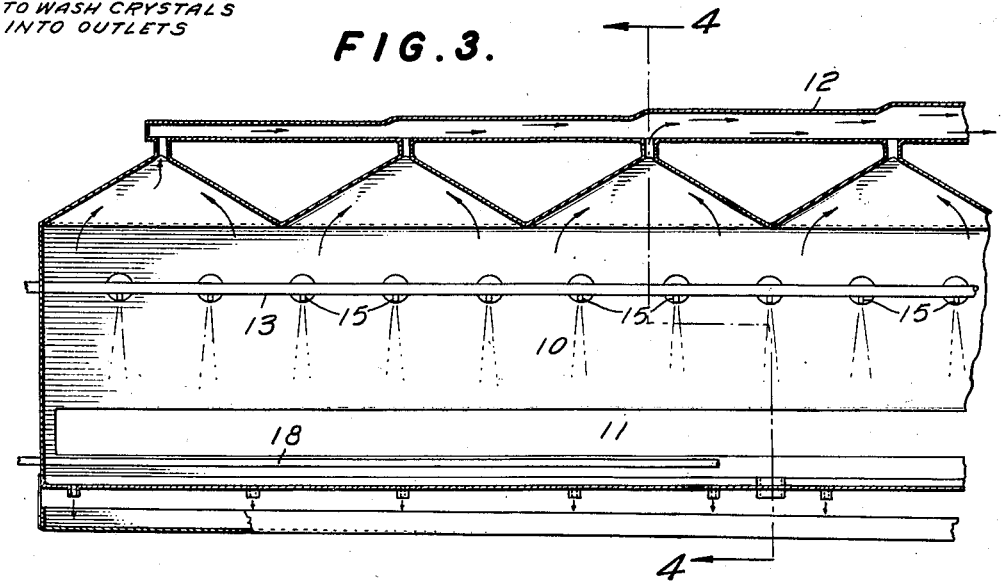
Figure 3 is an enlarged longitudinal sectional view of the interior of a portion of the apparatus of Figure 2.
Figure 4:
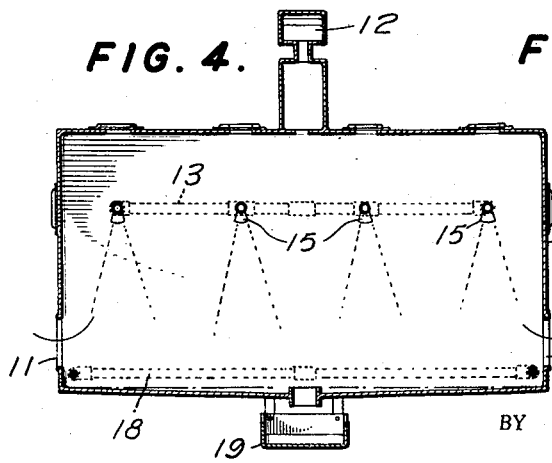
Figure 4 is a cross-sectional view of the chamber, taken along the line 4—4 of Figure 3.
Figure 5:
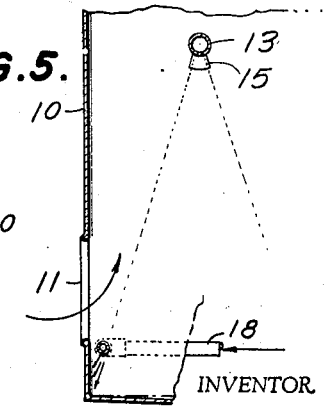
Figure 5 is a fragmentary view, somewhat enlarged, of one corner of the apparatus shown in Figure 4.

In order to simplify the description of the invention, its application to the preparation of minutely crystalline nitroguanidine is given in detail below, although the method and apparatus can be applied to the preparation of a number of other compounds which are likewise more useful when obtained in a finely divided crystalline state.

Referring now more specifically to the drawings, the apparatus consists of a solution or make up kettle 1 wherein a solution of nitroguanidine of predetermined concentration can be prepared using the recycled mother liquor as part of the solvent. The contents of the make up kettle are heated by injecting live steam or with the aid of a heating coil under the surface of the solution or by any similar heating means. From the make up kettle the hot solution is conveyed through pump 2, filter 3, to feed tank 4 from which pressure pump 5 forces the solution into the spray tank 10. The spray tank 10 has openings 11, through which a gas or air is drawn and passed through the interior of the chamber or tank 10 and out at the top to an exhaust duct 12 which is connected to a fan (not shown). In order to prevent excessive cooling of the hot solution the spraying pipes 13 and other apparatus may be steam jacketed or insulated as indicated by the broken lines 16, or variously otherwise protected against heat loss. It has been found preferable to heat the spraying pipes 13 before the system is started functioning by blowing steam through 14. This may also be used to remove the solution from the system at the end of each day's operation together with any crystals which may have formed in and around the nozzles 15. The steam jacket or insulating covering 16 maintains the heat losses at a minimum and thus keeps the pipes 13 at the desired high temperature. This avoids excessive cooling of the solution and crystal formation in the spraying pipes 13. The hot solution containing the material to be crystallized is forced under pressure through the spraying pipes. The rapid current of air passing upwards countercurrent to the spray from the nozzles causes the solvent to evaporate and cool rapidly and results in the precipitation of the solute in the form of a fine crystalline material suspended in minute drops of the solvent. These crystals and the solution in which they are suspended are deposited on the sides and bottom of the chamber where they are washed down by means of the mother liquor emptied thereover through flushing pipes 18. The newly formed crystals yield a slurry with the mother liquor and are conveyed down the trough 19, through pump 20 to be filtered in the filter press 21 wherein the crystals of nitroguanidine are collected, before the crystals have had a chance to grow. The filtrate is recycled, a portion going to the spraying chamber to wash down additional deposits while the remainder is recycled to prepare a new solution of nitroguanidine in the solution make up kettle 1.

Figure 6:
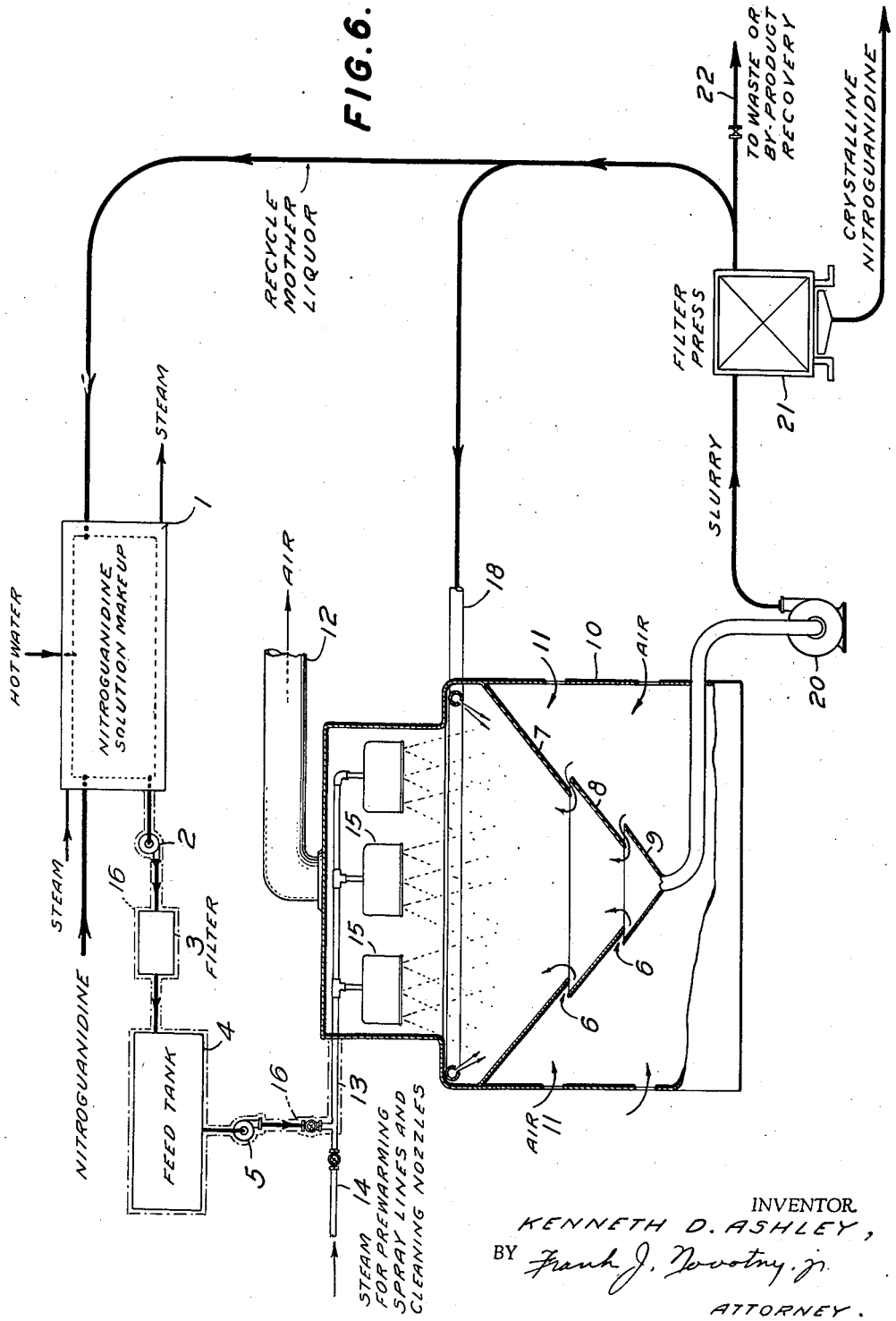
Figure 6 is a flow sheet including a detailed sectional view of a modified spray chamber.

In the variation of the spray chamber 10 shown in Figure 6, the spray nozzles 15 pass a fine mist-like solution downwards through a current of air which enters through openings 6 left between the axially disposed overlapping cone-shaped elements 7, 8 and 9, the latter serving to convey the wash water and suspended crystals through pump 20 to the filter press 21 for subsequent removal of the crystals.

During the operation of this process more and more impurities collect in, and are circulated by, the recycling mother liquor. In order to avoid the building up of excessive amounts of these impurities in the recycled mother liquor, from 15 to 20% of the latter is periodically bled through opening 22 to waste or to further processing. In its passage through the spray chamber 10, the nitroguanidine solution loses, by evaporation, approximately 10% or more of its solvent which is carried off in the exhausted air. This must be made up by the addition in the solution make up kettle 1 of a fresh supply of solvent equivalent to that lost by evaporation as well as that bled through opening 22.

The following examples illustrate the process of the invention more clearly; however, the invention is not to be deemed limited by these specific embodiments.

*Example 1*

A 4.0% solution of nitroguanidine in water was prepared at 90° to 100° C. and was then sprayed into the evaporating and cooling chamber at a pressure of 50 to 100 pounds per square inch. The spray lines should preferably be pre-warmed, as by steam, or well covered or steam jacketed to prevent the premature cooling and crystallization of the nitroguanidine in the spray lines or nozzles. The counter-current of air drawn upwards in the apparatus of this invention and against the sprayed solution served to evaporate and cool the droplets or mist quickly to below 40° C. or even to room temperature, and resulted in the precipitation of finely crystalline nitroguanidine less than $5\mu$ wide and less than $150\mu$ in length. The crystals formed were washed down to form a slurry and the latter separated out in a filter press or centrifuge, the mother liquor being recycled, a portion being used for the purpose of washing down an additional supply of crystalline nitroguanidine while the remainder was used to prepare a new solution of nitroguanidine.

*Example 2*

In a modified spray crystallizer having one nozzle, a 6.5 gallon tank was used having a fan directly over the spray nozzle; 4 pounds of a 5.5% aqueous solution of nitroguanidine heated to 95° C. were spray-cooled per minute in this tank. The crystals collected on the bottom and sides of the tank were less than $5\mu$ in width and $150\mu$ in length. The fan was adjusted to deliver 130 cubic feet of air per minute. The slurry of the nitroguanidine crystals was likewise filtered in a filter press similar to that described above in Example 1 and the mother liquor likewise recycled to the spray cooling tank to wash down any crystalline nitroguanidine formed.

*Example 3*

A 7.5% solution of nitroguanidine in water at 98° C. was prepared and recrystallized by spraying in the apparatus of this invention. The crystals obtained were all less than 5μ in width and 150μ in length.

Additional experiments were carried out, using the following variations and similar, highly satisfactory results were obtained:

| Example | Nitroguanidine solution | | Temperature exit air |
|---|---|---|---|
| | ° C. | Per cent conc. | |
| 4 | 105 | 8 | 61 |
| 5 | 108 | 8 | 51 |
| 6 | 104 | 7.5 | 50 |
| 7 | 104 | 7.5 | 44 |

In each case the majority of the crystals were of the desired size; namely, less than 5μ in width and 150μ in length.

*Example 8*

A 7.6% solution of nitroguanidine in water at 98° C. to 100° C. was prepared and recrystallized by spraying in the apparatus of Figure 6 using an orifice having a diameter of 0.1 inch. The crystals obtained had the following dimensions by count:

97% were less than 2.5μ wide
3% were between 2.5μ and 5.0μ wide
None were greater than 5.0μ wide
None were greater than 130.μ long

*Example 9*

5400 gallons per hour of a 7.5% solution of nitroguanidine were heated in the apparatus of Figure 6 to 98° C., filtered and pumped through a steam jacketed pipe supplying the spray nozzles while air was exhausted from the spray chamber 10 at the rate of 32,000 cubic feet per minute. The crystalline slurry obtained was pumped to the filter press 21 where the majority of the crystals were found to be of the desired size and had the following dimensions by actual count:

90% were less than 3.0μ in width
9% were between 3.0 and 5.0μ in width
1% were slightly greater than 5.0μ in width.
None were greater than 150.μ in length.

Although this invention has been specifically illustrated in the examples as used to prepare finely crystalline nitroguanidine, it can also be used to prepare other crystalline substances in a finely divided state, such as epsom salts, boric acid, citric acid, and the like.

In general, this invention contemplates in its broadest scope the spraying and scattering of droplets or the formation of a mist, or otherwise breaking up of a solution of a crystalline substance in a chamber through which a current of gas such as air or the like is circulating at room temperature to effect an evaporation and/or cooling of the solution to a point of supersaturation short of drying. It is to be noted that a dry product is not collected. Each small droplet of the solution or mist is scattered and in falling through the circulating gas is cooled very quickly by the rapid flow of gas and/or the evaporation of the solvent to a temperature at which it is supersaturated with the solute. As a result, very fine crystals of the solute suspended in the solvent are deposited on the sides and bottom of the chamber from which position they are removed by being washed with the wash water and filtrate from a previously sprayed solution to form a slurry. In this manner, the crystals, having a limited growth and suspended in a liquid matrix, are given no further opportunity to grow but are swept away in the form of a slurry. This slurry is then pumped to a filter press or to a similar type filter where the crystals are separated and one portion of the filtrate and wash water is recycled to the spraying chamber to wash down another supply of crystalline material while the remaining portion is recycled to the make up kettle 1 to prepare a new solution of nitroguanidine.

Although this invention is not to be deemed limited by any theory as to its mode of operation, it is believed that by spraying a solution of a crystalline substance into a region where the air is at room temperature or even at 40° or 50° C. and under atmospheric pressure while constantly circulating and changing, the droplets are cooled quickly and efficiently as by evaporation of the solute, conduction of heat, convection of heat, and the like; hence, in accordance with the solubility temperature relationship between the solute and solvent there results a supersaturated solution which yields finely divided crystalline particles suspended in a liquid matrix.

The constantly changing and circulating air in the chamber effects a partial evaporation of the aqueous solvent. This further accentuates the cooling process and results in supersaturation of the solution. Instead of air in the above apparatus, nitrogen, carbon dioxide or similar inert gases may be used.

It is to be understood that the examples given are merely illustrative and not limitative of this invention which is to be broadly construed in accordance with the scope of the appended claim.

I claim:

A continuous process for preparing finely divided nitroguanidine which comprises preparing an initial 4 to 7.5% aqueous solution of nitroguanidine at 90° to 100° C., spraying this solution in the form of minute drops into a chamber, passing a countercurrent of air at room temperature and atmospheric pressure through the chamber to cool the sprayed solution by evaporation of water from the surface of the drops and by their concentration to a point of supersaturation at which incipient precipitation of nitroguanidine crystals is effected, preventing further and excessive growth of the precipitated crystals in the sprayed drops by washing down the latter with a dilute solution of nitroguanidine, collecting the crystalline nitroguanidine by filtration, recycling a portion of the filtrate to form the initial aqueous solution and the remainder of the filtrate to serve as the dilute solution of nitroguanidine for washing down the crystals in the sprayed drops.

KENNETH D. ASHLEY.